United States Patent Office 3,012,945
Patented Dec. 12, 1961

3,012,945
PRODUCTION OF GLYCERINE BY FERMENTATION
Hiroshi Onishi, Noda-shi, Chiba-ken, Japan, assignor to Noda Industrial and Scientific Research Laboratory, Chiba-ken, Japan, a corporation of Japan
No Drawing. Filed Feb. 9, 1959, Ser. No. 791,858
Claims priority, application Japan May 28, 1958
8 Claims. (Cl. 195—38)

This invention relates to the production of glycerine, and more particularly is concerned with a method in which a concentrated sodium chloride medium containing sugars as principal material together with nitrogen sources, mineral salts, vitamins and the like as nutrients necessary to growth of yeast is inoculated with a salt-tolerant yeast, and then fermentation under the aerobic conditions is carried out.

An object of the present invention is to realize the production of glycerine in good yields and in safe manner, without causing putrefaction, and with low cost, employing very simple procedures. Other objects will be apparent from the description and claims which follow.

The present invention, which results from extensive studies on salt-tolerant yeasts, is based on the fact that growth, as well as fermentation, of a salt-tolerant yeast can be carried out in a characteristic environment that is a concentrated sodium chloride medium, whereby a considerable amount of glycerine is produced by the peculiar metabolism of the said yeast. In this point, accordingly, the present invention is quite different from any of the methods already employed. Thus, it will be clearly understood from the concrete embodiment as described hereinafter, that although in the past such processes for the production of glycerine by fermentation as a sulfite-added process (cf. Biochem. Z. 92, 234, 266 (1918)), an alkaline fermentation process (cf. Ind. Eng. Chem. (Ind. ed.) 11, 842–5 (1919), an ordinary fermentation process (cf. Arch. Biochem. 7, 257 (1945); Can. J. Research 23B, 290 (1945); Can. J. Microbiol. 2, 72 (1956); U.S.P. 2,793,981 (1957); Applied Microbiol. 6, 349 (1958)) and an inhibiting agent-added process (cf. J. Fermentation Technol. 29, 198 (1951)) are well known, the present invention is based on the new principle essentially different from that on which the above cited processes are based.

While it has been found that among various types of yeasts isolated from soy-sauce, bean paste (miso-paste), pickle salt and other salted food products there are present a large number of yeasts which show full growth in a concentrated NaCl medium containing about 20% sodium chloride, yeasts employed in the present invention are those which belong to genus Saccharomyces, genus Torulopsis, genus Pichia, genus Hansenula, genus Debaryomyces and genus Candida, according to the classification by Lodden and Kreger-van Rij (1952). Especially, yeasts of genus Saccharomyces such as *Saccharomyces rouxii* (cf. J. Agr. Chem. Soc. Japan, 14, 951, 1175, 1297 (1938); 15, 921, 1023, 1221 (1939); 16, 7 (1940); 18, 543, 629, 733, 940 (1942); Bull. Agr. Chem. Soc. Japan, 21, 151 (1957)), *Saccharomyces rouxii* var. *halomembranis* (cf. Bull. Agr. Chem. Soc. Japan 21, 151 (1957)), *Saccharomyces acidifaciens* (cf. Bull. Agr. Chem. Soc. Japan 21, 151 (1957)) and *Saccharomyces acidifaciens* var. *halomembranis* (cf. Bull. Agr. Chem. Soc. Japan 21, 151 (1957)) are successfully used in the present invention. These are so called osmophilic yeast, and now it has been recognized from the results of studies on salt-tolerance and sugar-tolerance of yeasts for over many years, that there is remarkable difference between both properties of salt-tolerance and sugar-tolerance, and that a sugar-tolerant yeast is not always salt-tolerant and a salt-tolerant yeast is not only tolerable to high osmotic pressure, but also has a resistance to the effect of salt itself. Thus, osmophilic yeasts are clearly divided into salt-tolerant yeasts and sugar-tolerant yeasts (cf. Bull. Agr. Chem. Soc. Japan 21, 137 (1957)).

Salt-tolerant yeasts used in the present invention may be isolated from such a material as soy-sauce, bean paste (miso-paste), pickle salt, salted greens or other salted food products by means of plate culture of said material on the concentrated NaCl medium containing about 18% sodium chloride, and mycological properties of *Saccharomyces rouxii* m. 3 (American Type Culture Collection No. 13356) being most successfully used in the present invention are specified as the following.

Vegetative cells (after cultivation in koji extract at 30° C. for 6 days):
  Cells are round or short oval, single or in pairs.
  The cells are generally measured to $(5-8) \times (5-10)\mu$.
Growth on koji agar after two weeks, at 30°: The streak culture is light cream colored, dull glistening, raised and almost smooth.
Slide culture on potato agar: No pseudomycelium.
Ascospore formation: Isogamous or heterogamous conjugation may precede ascus formation. One to four spores are found per ascus. Spores are round. (The spore formation is very difficult. Lodder and Kreger-van Rij (The Yeasts, a Taxonomic Study (1952)) also recognized that *Saccharomyces rouxii* scarcely forms spores, and classified many numbers of strains of which the spore formation was hardly observed at last as *Saccharomyces rouxii*.)
Growth in koji extract:
  NaCl-free medium—good growth, no film.
  18% NaCl medium—good growth, no film.
Fermentation of sugars:
  Fermented—glucose and maltose.
  Unfermented—galactose, saccharose and lactose.
Assimilation of sugars:
  Assimilated—glucose, galactose, maltose and saccharose.
  Not assimilated—lactose.
Assimilation of nitrates: Negative.
Growth in ethanol: No growth.
Splitting of arbutin: Negative.

This yeast, having a good tolerance to salt, is capable of growing even in 20 to 23% concentration of sodium chloride. In the cultivation of this yeast, however, it should be noted that this yeast, if cultivated in an ordinary medium, will be able to show a good growth in a widespread pH range, that is a pH of the medium from 2.6 to 8.0, but when in a concentrated NaCl medium containing 18% sodium chloride, will be able to show a good growth only in a range of pH from 4.0 to 5.0 (cf. Bull. Agr. Chem. Soc. Japan 21, 1943 (1957)).

As explained hereinabove, the fact that although a salt-tolerant *Saccharomyces rouxii* only produces a very small amount of glycerine in the NaCl-free ordinary medium, it can produce a remarkable amount of glycerine in accordance with the fermentation of said strain in the 18% NaCl-containing medium under aerobic conditions, is the basis on which the present invention depends, and such fact as above indicated will be clearly observed from Table 1 which follows:

Table 1

| Cultivating condition | NaCl-free medium | | | 18% NaCl medium | | |
|---|---|---|---|---|---|---|
| | Percent of glucose consumed | Percent of glycerine produced | Yield of glycerine from glucose consumed, percent | Percent of glucose consumed | Percent of glycerine produced | Yield of glycerine from glucose consumed, percent |
| Stationary culture | 6.20 | 0.504 | 8.1 | 5.10 | 0.759 | 14.8 |
| Shaking culture | 8.72 | 0.929 | 10.6 | 8.43 | 3.630 | 43.1 |

Used strain: *Saccharomyces rouxii* m. 3.
Initial concentration of glucose: 9.51%.
Period for cultivation: 10 days.

Thus, two types of media, which contain 10% glucose, 0.1% $KH_2PO_4$, 0.05% $MgSO_4 \cdot 7H_2O$, 0.01% $CaCl_2 \cdot 2H_2O$, 0.4% casamino acid and 0.1% yeast extract with or without 18% NaCl, were prepared. 100 cc. and 80 cc. portions of each medium were placed into 150 cc. volume Erlenmeyer flask and 500 cc. volume shaking flask respectively, and then, at 30° C. for a period of ten days, the former was subjected to a stationary culture and the latter to a shaking culture. (Procedure of shaking culture is described hereinafter.) Glucose and glycerine were quantitatively determined in accordance with Neish's method (cf. Analytical Methods for Bacterial Fermentation, 2nd rev., Natl. Research Council Can., Prairie Regional Lab., Saskatoon, Saskatchewan, N.R.C. No. 2952 (1952)). The experimental results are as shown in Table 1.

In a method according to the present invention, a medium to be employed would be prepared as follows: glucose and/or other fermentable sugars which are to be employed as principal material is dissolved to water, and to the resulting solution, nitrogen-containing substances, for example such organic materials as casein hydrolyzates, peptone, amino acids, urea or corn-steep liquor and such inorganic materials as ammonium sulphate or ammonium chloride, and other materials, for example, such inorganic materials as phosphates, magnesia salts or calcium salts and such organic materials as yeast extract or vitamins, which are nutrient necessary to growth and proliferation of yeast, are adequately added, and then a considerably large amount of sodium chloride being 10–20% by weight based on the weight of overall medium is further added. Then, the medium thus prepared is inoculated with the salt-tolerant yeast which is separately provided by cultivation, and thereafter subjected to fermentation at an adequate temperature (that may be approximately 30° C.) under aerobic condition, while sufficient air is supplied by means of adequate air-feeding or shaking. After about 10 days, the fermentation is complete. It would be observed from the experimental results, that glycerine corresponding to about 40% by weight based on the consumed sugar is produced. In order to isolate the produced glycerine from the fermentation broth, the fermentation broth at once is distilled at a temperature of 170 to 180° C., in a vacuum of 10 to 12 mm. Hg. Also the following procedure may be taken in order to isolate the glycerine: the fermentation broth is condensed to make a syrup, and the syrup is extracted with absolute alcohol, and then the solvent is removed by distillation and the residual glycerine can be purified by vacuum distillation under the aforesaid condition.

In the practice of the present invention, the fact that not merely the yield of glycerine production is superior to that of any conventional method, but also that the obtained fermentation broth containing no toxic components and having a fragrant odor can be directly used as materials of drink or food products or taste improving agents—although, of course, the pure products can be obtained by simple purification procedures—is very advantageous. Moreover, when a NaCl concentration of the culture medium exceeds 18%, it is advantageous, too, that the whole operations may be carried out in an open state, without any accompanying sterilizing operation.

The following example, which is intended as informative and typical only and not in a limiting sense, will illustrate the present invention.

As shown in Table 1, I have now observed that fermentation in a concentrated NaCl medium under aerobic condition is necessary. As basal medium, therefore, the medium containing 10% glucose, 0.1% $KH_2PO_4$, 0.05% $MgSO_4 \cdot 7H_2O$, 0.01% $CaCl_2 \cdot 2H_2O$, 18% NaCl, 0.4% casamino acid and 0.1% yeast extract was employed. Shaking culture was carried out using reciprocating type shaking apparatus having amplitude of 75 mm. and rotational frequency of 120 r.p.m.

Various nitrogen sources were used in place of casamino acid in the above medium, and the obtained results are set forth in Table 2 which indicates that widely varied substances can be used as nitrogen source.

Table 2

| Various nitrogen source-containing mediums | Percent of Consumed glucose | Percent of Produced glycerine | Yield of glycerine from sugar consumed, percent |
|---|---|---|---|
| Basal medium | 8.43 | 3.630 | 43.1 |
| 1% Peptone-added basal medium | 8.39 | 3.018 | 36.0 |
| 0.2% $(NH_4)_2SO_4$-added basal medium | 6.85 | 3.252 | 47.4 |
| 0.2% $NH_4Cl$-added basal medium | 3.48 | 1.746 | 50.1 |
| 0.02% Urea-added basal medium | 4.99 | 2.533 | 50.7 |
| 0.2% Ammonium lactate-added basal medium | 6.83 | 3.248 | 47.5 |
| 0.2% Ammonium acetate-added basal medium | 6.55 | 3.229 | 49.2 |
| 0.5% Meat extract-added basal medium | 8.20 | 3.589 | 43.8 |

Used strain: *Saccharomyces rouxii* m. 3.
Initial concentration of glucose: 10.65%.

The temperature for cultivation is preferably in a range of 28 to 33° C. As to air-feeding condition, although the above specified shaking condition is, of course, suitable, the excellent result can be obtained when Kd (g.-mol/min. atom. cc.) (cf. J. Agr. Chem. Soc. Japan 27, 704 (1953)) is in a range of $2 \times 10^{-6}$ to $8 \times 10^{-6}$. Kd is measured by sodium sulphite method.

The following Table 3, showing the experimental results when NaCl concentration varies and when potassium chloride is used in place of sodium chloride, indicates that such higher concentrations as 18% by weight of sodium chloride and 22% by weight of potassium chloride are most successfully used in the glycerine production.

Table 3

| NaCl- or KCl-mediums having various concentration | Consumed glucose, percent | Produced glycerine, percent | Yield of glycerine to consumed sugar, percent |
|---|---|---|---|
| No NaCl-containing medium | 8.72 | 0.929 | 10.6 |
| 6% NaCl-containing medium | 8.79 | 2.580 | 29.3 |
| 12% NaCl-containing medium | 8.57 | 2.195 | 25.6 |
| 18% NaCl-containing medium | 8.43 | 3.630 | 43.1 |
| 11% KCl-containing medium | 8.72 | 2.970 | 34.0 |
| 22% KCl-containing medium | 8.65 | 3.765 | 43.5 |

Used strain: *Saccharomyces rouxii* m. 3.
Initial concentration of glucose: 10.65%.

Also, when some of the specified strains were used in the preesnt invention, by-production of sugar alcohols such as D-arabitol, erythritol and the like in the amount of one-fifth or one-tenth of the produced glycerine amount was observed as the results of paper chromatography (cf. Biochem. J. 51, 653 (1952); J. Chem. Soc. Japan 73, 18 (1952)), as well as partition chromatography by celite (cf. Analytical Methods for Bacterial Fermentation, 2nd rev., Natl. Research Council Can., Prairie Regional Lab., Saskatoon, Sask., N.R.C. No. 2952 (1952)), of the product.

What I claim is:

1. In a process for the production of glycerine by fermentation under aerobic conditions in a nutrient medium inoculated with a microorganism, the improvement wherein the nutrient medium contains sugar, a source of nitrogen, mineral salts and vitamins in addition to 10 to 23% by weight, relative to the weight of the medium, of a chloride selected from the group consisting of sodium chloride and potassium chloride, and wherein the microorganism is *Saccharomyces rouxii*, whereby the yield of glycerine is enhanced.

2. In a process for the production of glycerine by fermentation under aerobic conditions in a nutrient medium inoculated with a microorganism, the improvement wherein the nutrient medium contains sugar, a source of nitrogen, mineral salts and vitamins in addition to 10 to 23% by weight, relative to the weight of the medium, of a chloride selected from the group consisting of sodium chloride and potassium chloride, and wherein the microorganism is *Saccharomyces rouxii* var. *halomenbranis*, whereby the yield of glycerine is enhanced.

3. In a process for the production of glycerine by fermentation under aerobic conditions in a nutrient medium inoculated with a microorganism, the improvement wherein the nutrient medium contains sugar, a source of nitrogen, mineral salts and vitamins in addition to 10 to 23% by weight, relative to the weight of the medium, of a chloride selected from the group consisting of sodium chloride and potassium chloride, and wherein the microorganism is *Saccharomyces acidifaciens*, whereby the yield of glycerine is enhanced.

4. In a process for the production of glycerine by fermentation under aerobic conditions in a nutrient medium inoculated with microorganism, the improvement wherein the nutrient medium contains sugar, a source of nitrogen, mineral salts and vitamins in addition to 10 to 23% by weight, relative to the weight of the medium, of a chloride selected from the group consisting of sodium chloride and potassium chloride, and wherein the microorganism is *Saccharomyces acidifaciens* var. *halomenbranis*, whereby the yield of glycerine is enhanced.

5. In a process for the production of glycerine by fermentation under aerobic conditions in a nutrient medium inoculated with a microorganism, the improvement wherein the nutrient medium contains sugar, a source of nitrogen, mineral salts and vitamins in addition to 10 to 25% by weight, relative to the weight of the medium, of a chloride selected from the group consisting of sodium chloride and potassium chloride, and wherein the microorganism is *Saccharomyces rouxii* m. 3 (ATCC No. 13365), whereby the yield of glycerine is enhanced.

6. In a process for the production of glycerine by fermentation under aerobic conditions in a nutrient medium inoculated with a microorganism, the improvement wherein the nutrient medium contains a sugar selected from the group consisting of glucose, fructose and mannose, a source of nitrogen, mineral salts and vitamins in addition to 10 to 23% by weight, relative to the weight of the medium, of a chloride selected from the group consisting of sodium chloride and potassium chloride, and wherein the microorganism is *Saccharomyces rouxii*, whereby the yield of glycerine is enhanced.

7. In a process for the production of glycerine by fermentation under aerobic conditions in a nutrient medium inoculated with a microorganism, the improvement wherein the nutrient medium contains sugar, a source of nitrogen, mineral salts and vitamins in addition to 18% by weight, relative to the weight of the medium, of sodium chloride, and wherein the microorganism is *Saccharomyces rouxii*, whereby the yield of glycerine is enhanced.

8. In a process for the production of glycerine by fermentation under aerobic conditions in a nutrient medium inoculated with a microorganism, the improvement wherein the nutrient medium contains sugar, a source of nitrogen, mineral salts and vitamins in addition to 22% by weight, relative to the weight of the medium, of potassium chloride, and wherein the microorganism is *Saccharomyces rouxii*, whereby the yield of glycerine is enhanced.

References Cited in the file of this patent

UNITED STATES PATENTS 1,368,023     Connestein et al.     Feb. 8, 1921

FOREIGN PATENTS 316,597     Great Britain     July 29, 1929

UNITED STATES PATENT OFFICE
CERTIFICATE OF CORRECTION

Patent No. 3,012,945            December 12, 1961

Hiroshi Onishi

It is hereby certified that error appears in the above numbered patent requiring correction and that the said Letters Patent should read as corrected below.

Column 6, lines 9 and 10, for "(ATCC No. 13365)" read -- (ATCC No. 13356) --.

Signed and sealed this 29th day of May 1962.

(SEAL)
Attest:

ERNEST W. SWIDER
Attesting Officer

DAVID L. LADD
Commissioner of Patents